(12) United States Patent
Hiremath et al.

(10) Patent No.: US 9,699,119 B2
(45) Date of Patent: Jul. 4, 2017

(54) DETERMINING TRANSMISSION RATES WHEN TRANSMITTING PARALLEL DATA STREAMS FROM A WIRELESS STATION OF A WIRELESS NETWORK

(71) Applicant: GainSpan Corporation, San Jose, CA (US)

(72) Inventors: Indudharswamy G Hiremath, Bangalore (IN); Pankaji Vyas, Bangalore (IN); Greg Winner, Orange, CA (US)

(73) Assignee: GainSpan Corporation, San Jose, CA (US)

( * ) Notice: Subject to any disclaimer, the term of this patent is extended or adjusted under 35 U.S.C. 154(b) by 119 days.

(21) Appl. No.: 14/659,622

(22) Filed: Mar. 17, 2015

(65) Prior Publication Data
US 2016/0278104 A1 Sep. 22, 2016

(51) Int. Cl.
| | | |
|---|---|---|
| H04W 4/00 | (2009.01) | |
| H04L 12/861 | (2013.01) | |
| H04W 72/02 | (2009.01) | |
| H04W 52/02 | (2009.01) | |
| H04W 52/04 | (2009.01) | |

(52) U.S. Cl.
CPC ......... *H04L 49/90* (2013.01); *H04W 52/0251* (2013.01); *H04W 52/0261* (2013.01); *H04W 52/04* (2013.01); *H04W 72/02* (2013.01); *Y02B 60/50* (2013.01)

(58) Field of Classification Search
CPC combination set(s) only.
See application file for complete search history.

(56) References Cited

U.S. PATENT DOCUMENTS

| | | | |
|---|---|---|---|
| 7,610,495 B2 | 10/2009 | Azadet et al. | |
| 7,808,952 B2 | 10/2010 | Duan et al. | |
| 7,864,678 B1 | 1/2011 | Sampath et al. | |
| 8,116,219 B1 * | 2/2012 | Petrus | H04W 28/10 370/252 |
| 8,184,551 B2 | 5/2012 | Hu et al. | |
| 8,531,988 B2 | 9/2013 | Hassan et al. | |
| 8,532,081 B1 * | 9/2013 | Narasimhan | H04L 1/0001 370/329 |
| 8,547,841 B2 | 10/2013 | Hamdi | |
| 8,767,548 B1 | 7/2014 | Bharghavan et al. | |
| 2004/0264488 A1 * | 12/2004 | Yoon | H04L 12/6418 370/412 |

(Continued)

OTHER PUBLICATIONS

Pamela X. Pan, Leo L. K. Yung, Xiapu Luo, Edmond W. W. Chan, and Rocky K. C. Chang, "Auto-Selecting the Rate Adaptation Algorithm in Wireless Networks", http://www4.comp.polyu.edu.hk/~csrchang/auto-select. pdf, pp. 1 to 6.

(Continued)

*Primary Examiner* — Frank Duong
(74) *Attorney, Agent, or Firm* — Pearl Cohen Zedek Latzer Baratz LLP (57) ABSTRACT

A wireless station (STA) of a wireless network transmits parallel data streams. The STA maintains transmission profiles, each corresponding to a respective data stream of parallel data streams. A transmission profile contains a set of rules or parameters, which are used for determining various characteristics in relation to transmission of packets in the corresponding data stream. The STA queues packets of each data stream in a corresponding queue. The STA selects a packet from a queue, and determines a transmission rate for the selected packet according to a transmission profile of the queue. The STA transmits the packet at the determined transmission rate. In an embodiment, the wireless network corresponds to an IEEE 802.11 network.

20 Claims, 5 Drawing Sheets

(56) References Cited

U.S. PATENT DOCUMENTS

| | | | |
|---|---|---|---|
| 2005/0128954 A1* | 6/2005 | Li | H04L 1/0002 370/252 |
| 2005/0286440 A1 | 12/2005 | Strutt et al. | |
| 2009/0059872 A1 | 3/2009 | Malik et al. | |
| 2010/0272167 A1 | 10/2010 | Liao et al. | |
| 2011/0292800 A1* | 12/2011 | Flinta | H04L 47/10 370/235 |
| 2014/0254649 A1 | 9/2014 | Afkhami et al. | |

OTHER PUBLICATIONS

Ranjini Guruprasad, Sujit Dey, "Rate Adaptation and Base Station Reconfiguration for Battery Efficient Video" Download "http://esdat.ucsd.edu/—ranjini/WCNC_2013.pdf", pp. 1 to 6.

Kang Li, Charles Krasic, Jonathan Walpole, Molly H. Shor, Calton Pu "The Minimal buffering requirements of congestion controlled interactive multimedia applications", http://digitalcommons.ohsu.edu/cgi/viewcontent.cgi?article=1048&context=csetech, 20, Oregon Health & Science University, 2001, pp. 1-15.

SmartRate: A new dynamic rate adaptation algorithm for 802.11 wireless networks, http://ieeexplore.ieee.org/xpl/login.jsp?reload=true&tp=&arnumber=5986389&url=http%3A%2F%2Fieeexplore.ieee.org%2Fxpls%2Fabs_all.jsp%3Farnumber%3D5986389, downloaded circa Jan. 6, 2015, p. 1.

Y. Sinan Hanay, Wei Li, Russell Tessier, Tilman Wolf, "Saving Energy and Improving TCP Throughput with Rate Adaptation in Ethernet", http://www.ecs.umass.edu/ece/wolf/pubs/icc2012-3.pdf, Department of Electrical and Computer Engineering, pp. 1 to 6.

* cited by examiner

DETERMINING TRANSMISSION RATES WHEN TRANSMITTING PARALLEL DATA STREAMS FROM A WIRELESS STATION OF A WIRELESS NETWORK

BACKGROUND

Technical Field

Embodiments of the present disclosure relate generally to wireless networks, and more specifically to determining transmission rates when transmitting parallel data streams from a wireless station of a wireless network.

Related Art

A wireless network generally includes two or more wireless stations capable of communicating with each other on a wireless medium. Wireless networks may also include switches such as access points (AP) or router nodes in the communication path between wireless stations. Electromagnetic radiation in the atmospheric space is used as the basis for the wireless communication, as is well known in the relevant arts.

A data stream contains an ordered sequence of packets, which are generated by applications executing in a wireless station. An application can generate multiple data streams, though different data streams being generated by different applications is more common Each data stream generally needs to be transmitted by the corresponding wireless station such that the packets eventually reach another application executing in another wireless station.

Two data streams are said to be parallel when there is a requirement to transmit packets in each stream according to the sequence order, but the applications at either end do not impose specific requirement on how the packets from the two streams are otherwise interspersed in the combined transmission sequence. The transmission sequence is generally determined based on factors such as any applicable QoS (quality of service) requirements (e.g., aggregate bandwidth to be allocated to each application, latency acceptable, etc.).

Wireless stations often transmit each packet with a corresponding transmission rate, which is one of several transmission rates the wireless station is capable of transmitting at. Transmission rate is measured as the number of bits transmitted in a unit time (typically a second). A higher transmission rate often implies more transmission throughput, but can be susceptible to errors. However, lower transmission rates can lead to enhanced power consumption due to the longer duration taken for completion of transmission.

Aspects of the present disclosure are directed to determining transmission rates when transmitting parallel data streams from a wireless station of a wireless network.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A wireless station (STA) of a wireless network transmits parallel data streams. The STA maintains transmission profiles, each corresponding to a respective data stream of parallel data streams. The STA queues packets of each data stream in a corresponding queue. The STA selects a packet from a queue, and determines a transmission rate for the selected packet according to a transmission profile of the queue. The STA transmits the packet at the determined transmission rate. In an embodiment, the wireless network corresponds to an IEEE 802.11 network.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
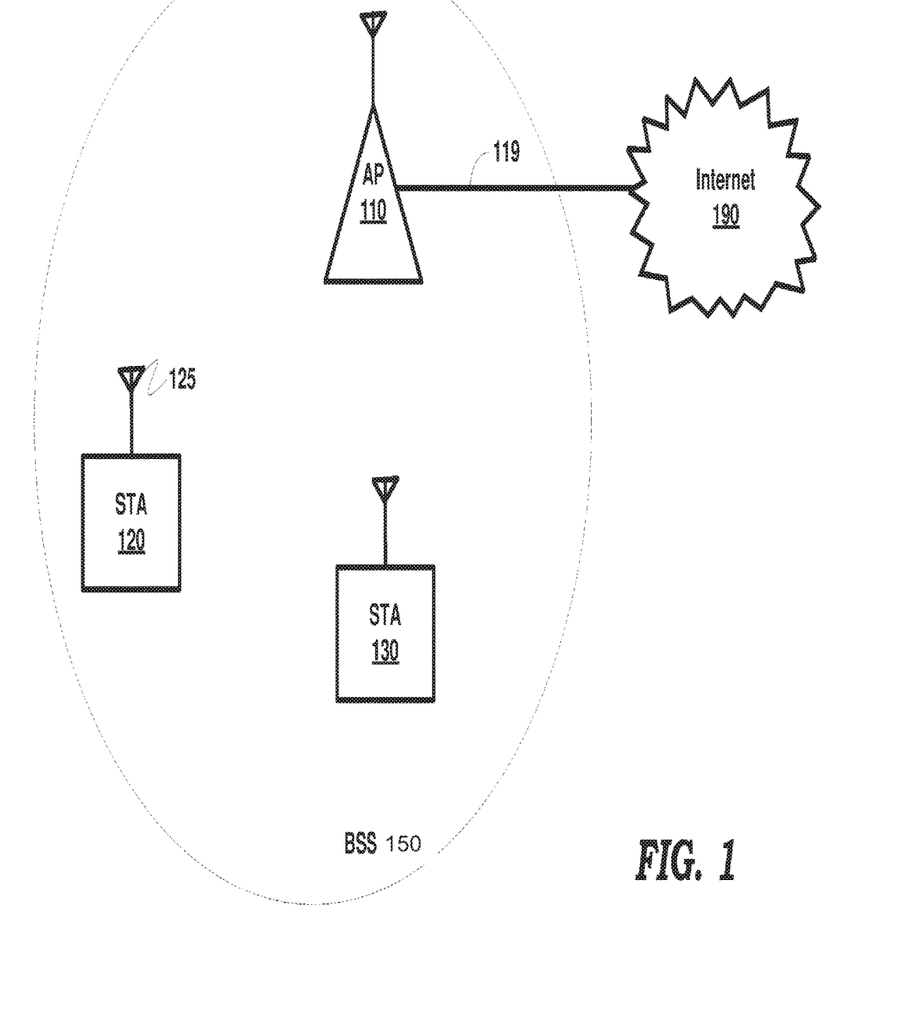
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing access point (AP) 110, wireless stations (STA) 120 and 130, and internet 190.

Internet 190 extends the connectivity of devices (STA 120 and STA 130) in BSS 150 to various systems (not shown) connected to, or part of, internet 190. Internet 190 is shown connected to AP 110 (which may be viewed as operating as a border router as well) through a wireless path 119. Internet 190 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Each of STAs 120 and 130 represents an end device that may execute various user applications. STAs 120 and 130 may communicate with each other via AP 110. Further one or both of STA 120 and 130 may communicate with devices in internet 190 also via AP 110. In an embodiment, AP 110, STA 120 and STA 130 form a basic service set (BSS) 150 consistent with IEEE 802.11 family of standards. The antenna of STA 120 is shown numbered as 125. While the components and devices of FIG. 1 are noted as being designed to operate according to IEEE 802.11 family of standards, in other embodiments, the components and devices of FIG. 1 may be designed to operate consistent with other wireless standards such as, for example, IEEE 802.15.4.

The user application(s) being executed in a STA (120 or 130) may generate parallel data streams, each containing a corresponding ordered sequence of IP packets. For example, respective applications executing in STA 120 may generate a video data stream, a voice data stream and a sensor data stream representing temperature or pressure values (obtained from a sensor connected to STA 120, but not shown). The data streams may be destined to a same or a correspondingly different device (either STA 130 or a device in internet 190).

Aspects of the present disclosure relate to determining transmission rates when transmitting parallel data streams from a wireless station of a wireless network, as described below with examples.

3. Transmitting Parallel Data Streams

Figure 2:
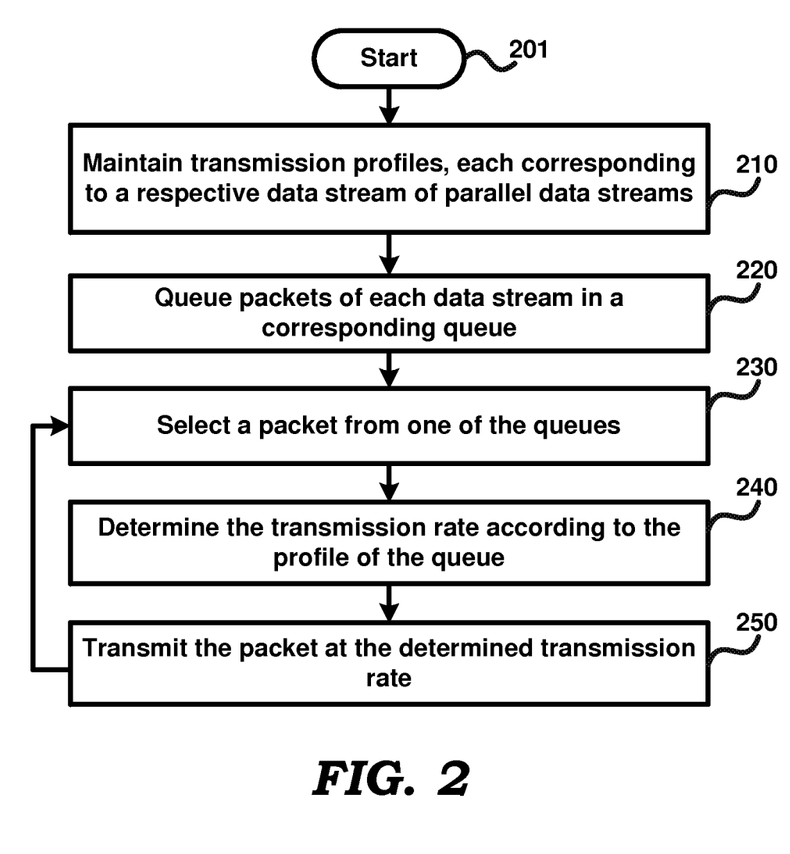
FIG. 2 is a flow chart illustrating the manner in which a wireless station (STA) of a wireless network transmits parallel data streams, in an embodiment of the present disclosure.

FIG. 2 is a flow chart illustrating the manner in which a STA of a wireless network transmits parallel data streams, in an embodiment of the present disclosure. Merely for illustration, the flowchart is described below as being performed in STA 120. However, the features can be implemented in STA 130 also, as well as in other environments, without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, STA 120 maintains transmission profiles, each corresponding to a respective data stream of parallel data streams. A transmission profile contains a set of rules or parameters, which are used for determining various characteristics in relation to transmission of packets in the corresponding data stream. The set of rules may differ for data streams having dissimilar transmission requirements or transmission objectives. For example, a data stream that needs to meet a minimum throughput requirement (i.e., effective number of packets per unit time successfully transmitted to destination device) may have a transmission profile different from a data stream that needs to minimize transmission power requirements at STA 120.

In an embodiment, the set of rules corresponding to a transmission profile includes rules for selecting an initial (start) transmission rate, the specific lower rates to be attempted in case of failure of a current transmission, conditions for reducing the transmission rate (fallback) and conditions for increasing the transmission rate (climb-up). Thus, in the example of three parallel streams, namely, a video data stream, a voice data stream and a sensor data stream, STA 120 maintains three transmission profiles, respective one for each of the three streams. Control then passes to step 220.

In step 220, STA 120 queues packets of each data stream in a corresponding queue. Thus, in the above-noted example, STA 120 maintains three separate queues, one for each of the video data stream, the voice data stream and the sensor data stream, and queues the packets (for example, as they are generated) in the respective queue. Control then passes to step 230.

In step 230, STA 120 selects a packet from one of the queues. The determination as to which queue a packet is selected from may be determined, for example, by the medium access control (MAC) protocol, such as EDCA (Enhanced Distributed Channel Access) in case of 802.11 MAC. Alternatively, or in addition, such selection may be based on inputs from the transmission profiles corresponding to the respective queues. Control then passes to step 240.

In step 240, STA 120 determines the transmission rate (to be used for the packet selected in step 230) according to the transmission profile of the queue from which the packet was selected. In other words, the rules within the transmission profile associated with the queue determine the transmission rate. Control then passes to step 250.

In step 250, STA 120 transmits the packet (selected in step 230) at the determined transmission rate. Control then passes to step 230, and steps 230, 240 and 250 are repeated for another packet.

Accordingly, the transmission rate for packets in one data stream may be based on one transmission profile and the transmission rate for packets in another data stream may be based on another transmission profile. Thus, STA 120 transmits parallel data streams, with the specific transmission rate of each packet of the corresponding data stream determined by the corresponding profile.

In an embodiment, the transmission rate is determined by a rate adaptation module in STA 120, and the interaction between corresponding blocks/modules in the embodiment is illustrated next with an example.

4. Blocks

Figure 3:
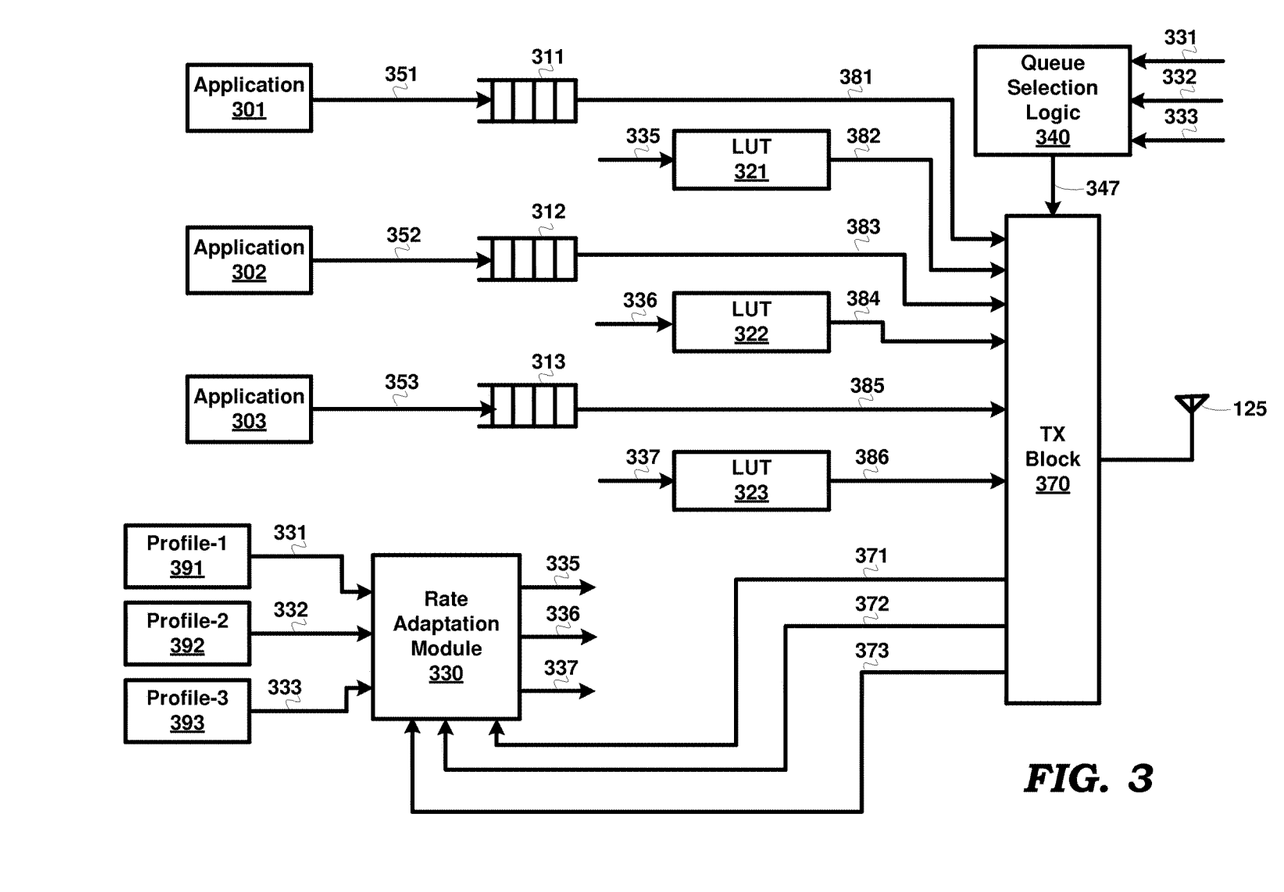
FIG. 3 is a block diagram showing relevant blocks/components of a STA that are operational in determining transmission rates of packets of parallel data streams, in an embodiment of the present disclosure.

FIG. 3 is a block diagram showing relevant blocks/components of STA 120 operational in determining transmission rates of packets of parallel data streams, in an embodiment of the present disclosure. The diagram is shown containing applications 301, 302 and 303, queues 311, 312 and 313, look-up tables (LUT) 321, 322 and 323, rate adaptation module 330, queue selection logic 340, transmit (TX) block 370, antenna 125, and profiles 391, 392 and 393. The same path/connection (e.g., 335-337 and 331-333) is shown with the same reference number, though shown as disconnected lines, merely for ease of depiction of the blocks and their interrelationships.

Each of applications 301, 302 and 303 represents a respective set of software instructions that execute to provide desired user features. For example, application 301 may represent a video application that generates a video data stream (and an audio stream, though not shown), application 302 may represent a voice/speech application that generates a voice data stream, and application 303 may represent a sensor data stream. The three data streams are parallel data streams. Applications 301, 302 and 303 respectively store (in the form of a queue) generated data packets in queues 311, 312 and 313 respectively via respective paths 351, 352 and 353.

LUT 321 stores a value representing the transmission rate to be used (by TX block 370, described below) to transmit a next packet from queue 311. LUT 321 receives the value from rate adaptation module 330 (described below) on path 335. LUT 322 stores a value (received from rate adaptation module 330 on path 336) representing the transmission rate to be used by TX block 370 to transmit a next packet from queue 312. LUT 323 stores a value (received from rate adaptation module 330 on path 337) representing the transmission rate to be used by TX block 370 to transmit a next packet from queue 313. Each of the values stored in LUT 321, 322 and 323 gets over-written (replaced) when rate adaptation module 330 writes a corresponding new value in LUT 321, 322 and 323. As will be clear from the description below, each queue 311, 312 and 313, is associated with a corresponding transmission profile.

Queue selection logic 340 determines the specific one of queues 311, 312 and 313 from which TX block 370 is to select a next packet for transmission based on the three profiles 391, 392 and 393, accessible (retrieved) via respective paths 331, 332 and 333. Queue selection logic 340 may make the determination based on bandwidth, latency requirements, etc., of data streams corresponding to the profiles, and/or according to a MAC protocol such as EDCA (Enhanced Distributed Channel Access) in case of 802.11 MAC. As an example, queue selection logic 340 may maintain three separate counters, one for each queue, and initialize the counters to corresponding predetermined values. Each of the three counters then count downwards upon transmission of each packet (from any of the queues). When the corresponding counter reaches zero, queue selection logic 340 indicates to TX block 370 on path 347 the specific queue from which a next packet is to be transmitted. The initial value from which a counter starts count-down reflects the bandwidth, latency requirements, etc. Thus, for example, the initial count for a low-bandwidth data stream would be larger than the initial count for a high-bandwidth data stream.

TX block 370 receives (on path 347) from queue selection logic 340 an indication of which queue a next packet is to be transmitted from, and retrieves the packet from the corresponding queue. TX block 370 retrieves the transmission rate to be used for transmitting the retrieved packet from the corresponding one of LUTs 321, 322 and 323, via respective paths 382, 384 and 386. Thus, if the packet to be transmitted was retrieved from queue 311, TX block 370 retrieves the transmission rate from LUT 321. If the packet to be transmitted was retrieved from queue 312, TX block 370 retrieves the transmission rate from LUT 322. If the packet to be transmitted was retrieved from queue 313, TX block 370 retrieves the transmission rate from LUT 323. TX block 370 then transmits the packet (from the corresponding one of queues 311, 312 and 313, retrieved via respective paths 381, 383 and 385) at the corresponding transmission rate.

In response to transmission of a packet, TX block 370 either receives an acknowledgement (within a predetermined window of time following transmission of the packet by TX block 370) or does not receive any acknowledgement from the destination device to which the packet was addressed. Receipt of an acknowledgement indicates that the transmitted packet was successfully received by the destination device, while the lack of an acknowledgement indicates that the packet was not received by the destination device. TX block 370, in turn, forwards a message (success/failure) to rate adaptation module 330 on the corresponding one of paths 371, 372 and 373 (depending on whether the packet transmitted was retrieved from queue 311, 312 or 313 respectively), with the message specifying whether an acknowledgement was received on not.

Rate adaptation module 330 operates to determine the transmission rate with which a packet is to be transmitted (for each packet in each of queues 311, 312 and 313), based on a corresponding transmission profile. It is assumed herein that the transmission profiles for packets in queues 311, 312 and 313 are respectively contained in 391 (Profile-1), 392 (Profile-2) and 393 (Profile-3). Rate adaptation module 330 accesses the profiles 391, 392 and 393 via respective paths 331, 332 and 333. Queue 311 contains packets of a video data stream and is associated with Profile-1 (391). Queue 312 contains packets of a voice/speech data stream and is associated with Profile-2 (392). Queue 313 contains packets of a sensor data stream and is associated with Profile-3 (393).

Rate adaptation module 330 employs the rules in a transmission profile (in conjunction with success/failure messages from TX block 370) to determine the transmission rate for a next packet in a queue, and stores the rate in the corresponding LUT. Rate adaptation module 330 may compute one or more parameters in determining the transmission rate for a next packet from a corresponding queue. As noted above with respect to an embodiment, corresponding to each profile, rate adaptation module 330 determines an initial (start) transmission rate for a (first) packet corresponding to the profile/queue, the specific lower rates to be attempted in case of failure of a current transmission (as determined by the success/failure message received on the correspond path 371, 372 and 373), conditions for reducing the transmission rate (fallback), and conditions for increasing the transmission rate (climb-up). In the embodiment, transmission rates for packets following a start/initial packet are determined by rate adaptation module 330 based on the conditions and the specific lower rates noted above.

Example transmission profiles and the manner in which rate adaptation module 330 computes a transmission rate consistent with the corresponding transmission profile are briefly described next.

5. Transmission Profiles

In an embodiment, two types of transmission profiles may be employed in STA 120, one when high packet throughput is the objective, and the other when minimization of transmission power in STA 120 is the objective. The two profiles are respectively termed "High-Throughput Profile", and "Low-Power Profile".

In the low-power profile, the emphasis is on minimizing power consumption in TX block 370 (FIG. 3). In general, use of higher transmission rates reduces power consumption. However, a large number of retries (retransmission of a packet when no acknowledgement of receipt by the destination is received) may be wasteful of power. Therefore, the low-power profile is aggressive in climb-up as well as fallback to maximize power save. STA 120 uses the low-power profile for transmitting packets of the sensor data stream, and thus Profile-3 (393) contains the low-power profile.

In the high-throughput profile, the emphasis is on meeting the minimum required data throughput (i.e., being able to sustainably transmit a minimum required number of bits per second). To maintain minimum required throughput, climb-up is aggressive till the minimum required transmission rate is reached, but not aggressive in climb-up thereafter. Fall-back is not aggressive, i.e., on transmission failure, the current transmission rate is not reduced immediately, but is reduced only upon repetitive transmission failures. STA 120 uses the high-throughput profile for transmitting packets of each of the video data stream and voice data stream, but may employ different parameter (or threshold) values for the two streams, as briefly noted below. Thus, each of Profile-1 (391) and Profile-2 (392) contain the high-throughput profile but possibly with different thresholds.

The manner in which initial (start) transmission rate, the specific lower rates to be attempted in case of failure of a current transmission, conditions for reducing the transmission rate (fallback) and conditions for increasing the transmission rate (climb-up) are determined for each of the low-power profile and high-throughput profile are briefly described next, with a more detailed algorithm listing being provided in appendices A and B below.

For each profile, rate adaptation module 330 maintains a 'success' counter, a 'failure' counter, a 'winning/losing streak' counter (streakcounter) and a 'rateEpoch' counter corresponding to each transmission rate. Additionally, STA 120 maintains for each profile, a single global epoch counter.

The success counter and failure counter are used to count the total number of successes and failures for each transmission rate, and are updated after each transmission at that transmission rate. If the transmission was successful at the first attempt, then the corresponding success counter is updated. If transmission was successful with retries, then the success counter corresponding to the successful transmission is incremented, and the failure counters for all the rates that were attempted, but failed, are decremented.

On every successful transmission (at a transmission rate), the streakcounter corresponding to that transmission rate is incremented. On the first failure at a transmission rate, the streakcounter is set to −1, and for each subsequent failure, the streakcounter is decremented by 1. Upon a next successful transmission, the streak counter is set to 1, and incremented on every subsequent successful transmission (assuming there are no failures in between). The winning/losing streak (i.e., the value in the streakcounter) is used for transmission rate selection during climb-up (as described below).

The global epoch counter is incremented on transmission of every frame/packet. Each time a transmission rate is attempted (whether the transmission is successful or not), the rateEpoch counter corresponding to the transmission rate is incremented. The difference between global epoch counter value and the rateEpoch counter value for a transmission rate specifies the number of frames transmitted since that rate was attempted last.

The manner in which the counters noted above are used by rate adaptation module 330 to determine a transmission rate for a next packet corresponding to a transmission profile is briefly described next with respect to an embodiment. Description for the low-power profile is provided first followed by description for the high-throughput profile.

For the low-power profile, rate adaptation module 330 selects the initial transmission rate based on received signal strength indicator (RSSI), which is a measure of the power level being received by the antenna of a wireless receiver (here antenna of STA 120). The higher the RSSI, the stronger the signal, and less noisy the wireless channel (in general). Accordingly, if the RSSI is very high, STA 120 selects a correspondingly high initial transmission rate. For lower values of the RSSI, STA 120 selects correspondingly lower values of the initial transmission rate.

Rate adaptation module 330 uses a set of retry rates in case of failure of (every) current transmission rate. Retry rates are a set of increasingly lower transmission rates from the current transmission rate. If a current rate is unsuccessful, then lower rates from the set are attempted successively. If a rate from the set results in successful transmission, then STA 120 falls back to (i.e., employs) the successful retry rate. However, if all the rates in the retry rate set result in unsuccessful transmission, then STA 120 selects that rate from the rate set which has had more successes than failures (i.e., the rate for which value of its success counter is greater than value of its failure counter).

Rate adaptation module 330 attempts climb-up after three successful transmissions at the current rate. Once three successful transmissions at the current rate are successful, rate adaptation module 330 attempts transmission at the highest possible rate (allowed by the standard) if the streakcounter corresponding to the highest possible rate is non-negative. However, if the streakcounter of the highest possible rate is negative, then rate adaptation module 330 determines the number of frames that have been transmitted (at other rates) since transmission at the highest possible rate was last attempted, with rate adaptation module 330 obtain such number of frames by subtracting the rateEpoch counter value corresponding to the highest possible rate from the global epoch counter. If such difference is greater than the absolute value of the streakcounter of the highest possible rate, the rate (termed contingentRate) may be considered at a later time point.

Rate adaptation module 330 may then evaluate a next lower rate (from the highest possible rate) and the similar determinations as noted above with respect to the highest possible rate are performed. If rate adaptation module 330 finds a rate for which streakcounter is non-negative, then such rate is selected as the transmission rate. However, if rate adaptation module 330 does not find even one rate higher than the current rate for which streakcounter is non-negative, then the highest contingentRate is set as the next transmission rate.

For the high-throughput profile, rate adaptation module 330 selects the minimum required physical layer (PHY) rate corresponding to the throughput rate of the data stream of the profile as the initial rate. As an example, for the video data stream, a throughput rate of 5 Mbps may be deemed necessary, and a corresponding minimum required PHY rate would (approximately) be 8 Mbps. If 8 Mbps is not available for use (e.g., standard may not allow such a rate), rate adaptation module 330 selects the next higher rate (say 9 Mbps) as the initial rate.

For the high-throughput profile also, rate adaptation module 330 maintains a set of retry rates for each current transmission rate. However, the manner in which rate adaptation module 330 applies fallback to lower rates in the event of an unsuccessful transmission is different from that applied in the low-power profile. If a current rate is unsuccessful, then lower rates from the retry rate set are attempted successively. If a rate from the set results in successful transmission, then rate adaptation module 330 falls-back to (i.e., employs) the successful retry rate only if the successful rate is greater than or equal to minimum required PHY rate (noted above). However, if the successful retry rate is less than the minimum required PHY rate, and if the first attempted transmission rate (the 'current rate' noted above) is greater than the minimum required PHY rate, then rate adaptation module 330 falls back to minimum required PHY rate, i.e., sets the minimum required PHY rate as the next transmission rate.

On the other hand, if the successful retry rate is less than the minimum required PHY rate, and if the first attempted transmission rate is also less than the minimum required PHY rate, then rate adaptation module 330 falls back to the retry rate that was successful. However, if all the retry rates (in the retry rate set) were unsuccessful, then rate adaptation module 330 sets the lowest rate from the rate set that has a has had more successes than failures (i.e., the rate for which value of its success counter is greater than value of its failure counter).

Rate adaptation module 330 attempts climb-up after three successful transmissions (three being an example of a threshold, which can be different for a different high-throughput profile such as for the voice/speech application 302) at the current rate if the current rate is lower than the minimum required PHY rate. However, if the current rate is greater than equal to the minimum required PHY rate, rate adaptation module 330 attempts climb-up only after ten successful transmissions (ten being another example of a threshold) at the current rate. The selection of the higher rate for climb up is identical to that used for low-power profile, except that an evaluated rate is stored as a contingent rate only if the difference between the global epoch counter and the rateEpoch counter for the evaluated rate is greater than the absolute value of (three times the streakcounter for the evaluated rate), wherein the number three is another example of a threshold.

It may be observed from a comparison of the two profiles described above that different considerations are used in determining the transmission rate according to the two profiles. For example, and as noted above, the emphasis in low-power profile is minimization of transmission power, and hence the initial rate is selected to be as high as possible (based on RSSI). On the other hand, for the high-throughput profile, throughput is the emphasis, and the initial rate is the minimum required PHY rate. Further, in low-power profile, fallback is less aggressive than in high throughput profile, while climb-up is more aggressive than in high-throughput profile.

The low-power profile and high-throughput profile are provided merely as examples, and any other transmission profile as suited for the specific environment or application can instead be also used.

Description of a diagram illustrating transmission of parallel data streams according to the low-power profile and high-throughput profile is provided next.

6. Illustration

Figure 4:
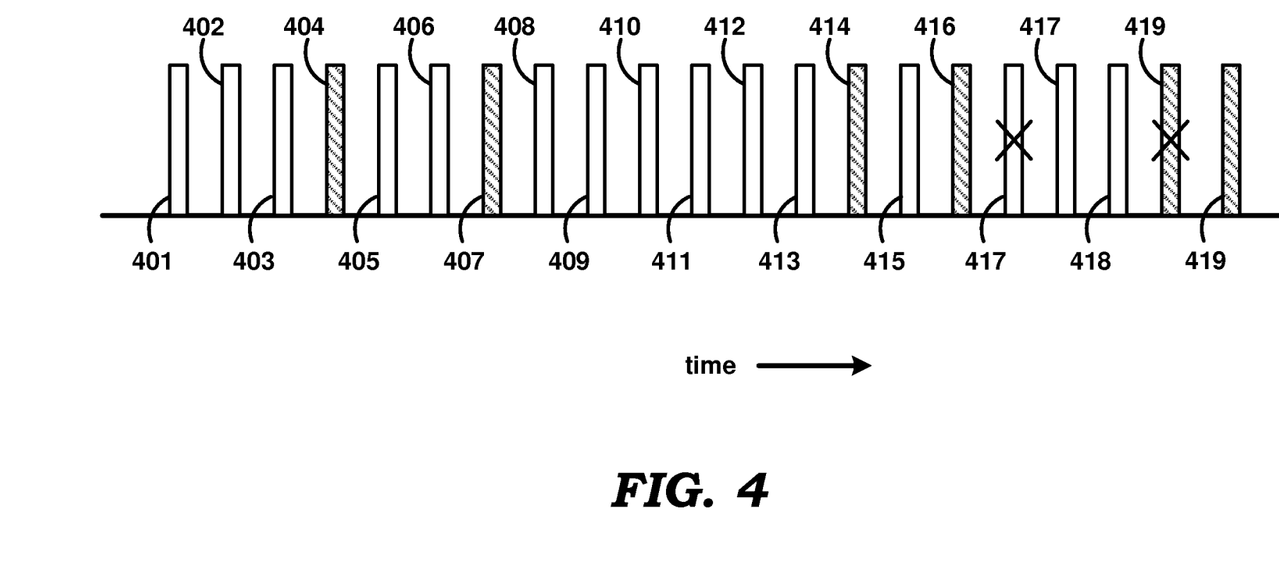
FIG. 4 is a diagram illustrating transmission of parallel data streams according to corresponding transmission profiles by a STA, in an embodiment of the present disclosure.

FIG. 4 is a diagram illustrating transmission of parallel data streams according to corresponding transmission profiles by STA 120, in an embodiment. In FIG. 4, the un-hashed bars represent corresponding packets of a video stream, while the hashed bars represent corresponding packets of a sensor data stream. Packets of the video data stream are transmitted with transmission rates determined according to the high-throughput profile, while packets of the sensor data stream are transmitted with transmission rates determined according to the low-power profile. For simplicity, packets of the voice data stream are not shown in FIG. 4. In the diagram bars with a cross mark across them are assumed to be unsuccessful packet transmissions, while bars without a cross mark across them are assumed to be successful transmissions.

Packet 401 is assumed to be the initial packet of the video data stream, and is successfully transmitted at the minimum required PHY rate (e.g. 9 Mbps), as noted above. Packets 402, 403, 405, 406, 408, 409, 410, 411 and 412 are subsequent packets of the video stream, and are each transmitted successfully at the minimum required PHY rate. Since ten successive packets of the video data stream were successful, the next packet 413 is transmitted at the highest possible rate (65 Mbps), which is also assumed to be successfully transmitted.

Packet 404 is assumed to be the initial packet of the sensor data stream, and is successfully transmitted at the highest rate selected based on RSSI. Packets 407 and 414 are subsequent packets of the sensor data stream, and are each transmitted successfully at the same rate as packet 404. Since three successive packets of the sensor data stream were successfully transmitted, the next packet 416 is transmitted at the highest possible rate (65 Mbps), and is also assumed to be successfully transmitted.

Packets 413 and 415 of the video data stream are assumed to be successfully transmitted at the highest possible rate (65 Mbps). However, packet 417 transmitted at 65 Mbps is assumed to be a failed transmission. Accordingly, packet 417 is re-transmitted at the next lower rate (which is lower than 65 Mbps but greater then 9 Mbps), and the transmission at the lower rate is assumed to be successful, and the lower rate becomes the fallback rate since it would be greater than the minimum required PHY rate. Packet 418 is also transmitted at the same rate as successful transmission 417.

Packet 419 of the sensor data stream transmitted at 65 Mbps is assumed to be a failed transmission. Accordingly, packet 419 is re-transmitted at the next lower rate, and the transmission at the lower rate is assumed to be successful, and the lower rate becomes the fallback rate.

Further packets of the data streams may be transmitted in accordance with the respective transmission profiles, described in detail above. The description is continued with an illustration of the implementation details of a STA in an embodiment.

7. Wireless Station

Figure 5:
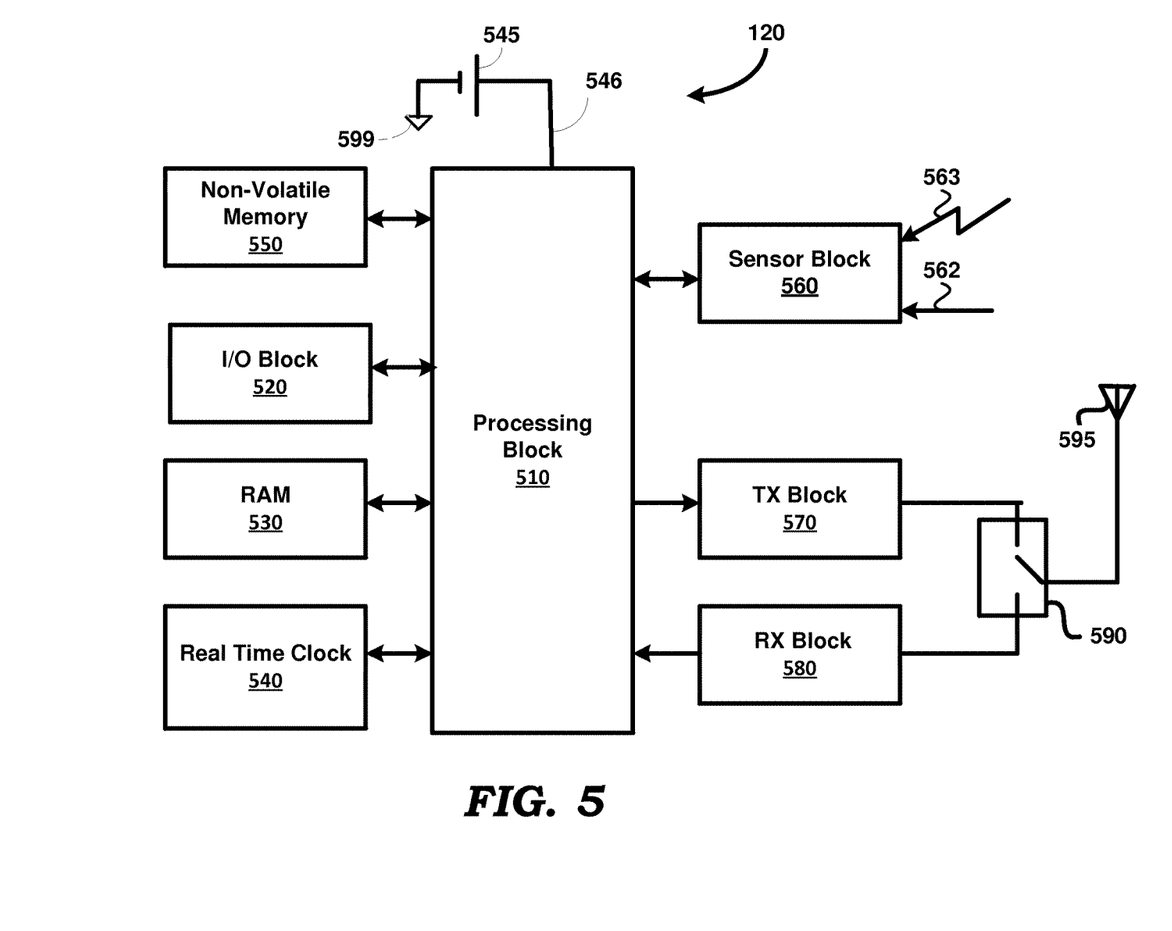
FIG. 5 is a block diagram illustrating the implementation details of a STA in an embodiment of the present disclosure.

FIG. 5 is a block diagram showing the implementation details of a STA in an embodiment of the present disclosure. STA 120 is shown containing processing block 510, input/output (I/O) block 520, random access memory (RAM) 530, real-time clock (RTC) 540, battery 545, non-volatile memory 550, sensor block 560, transmit (TX) block 570, receive (RX) block 580, switch 590, and antenna 595. The whole of STA 120 may be implemented as a system-on-chip (SoC), except for battery 545 and antenna 595. Alternatively, the blocks of FIG. 5 may be implemented on separate integrated circuits (IC). Terminal 599 represents a ground terminal. STA 130 may also be implemented as shown in FIG. 5, and as described below.

Battery 545 provides power for operation of STA 120, and may be connected to the various blocks shown in FIG. 5 (although shown connected only to RTC 540). While STA 120 is shown as being battery-powered, in another embodiment, STA 120 is mains-powered and contains corresponding components such as transformers, regulators, power filters, etc. RTC 540 operates as a clock, and provides the 'current' time to processing block 510.

I/O block 520 provides interfaces for user interaction with STA 120, and includes input devices and output devices. The input devices include a camera (which generates video signals/data), microphone (which generates voice/speech signals/data), keyboard and a pointing device (e.g., touchpad, mouse). I/O block 520 provides the signals/data generated by the input devices to processing block 510 after appropriate processing. Applications 301 and 302 may respectively process (e.g., form packets from) corresponding data received from the camera and microphone respectively. Output devices in I/O block 520 includes a display unit and corresponding display signal processing circuitry, which receives data from processing block 510 and processes the data for display on the display unit. A user may provide various transmission profiles (e.g., 391, 392 and 393 of FIG. 3) via I/O block 520.

Sensor block 560 may contain one or more sensors, as well as corresponding signal conditioning circuitry, and provides to processing block 510, measurements/values of physical quantities such as temperature, pressure, etc., sensed via wired path 562 or wireless path 568. Sensor block 560 may perform analog-to-digital conversion of the measurement/values prior to forwarding the measurements/values to processing block 510. Application 303 (of FIG. 3) may further process the (digitized) measurements/values and form packets containing such values.

Antenna 595, corresponds to antenna 125 of FIGS. 1 and 3, and operates to receive from, and transmit to, a wireless medium, corresponding wireless signals (e.g., according to IEEE 802.11 (WLAN) standards). Switch 590 may be controlled by processing block 510 (connection not shown) to connect antenna 595 to one of blocks 570 and 580 as desired, depending on whether transmission or reception of wireless signals is required. Switch 590, antenna 595 and the corresponding connections of FIG. 5 are shown merely by way of illustration. Instead of a single antenna 595, separate antennas, one for transmission and another for reception of wireless signals, can also be used. Various other techniques, well known in the relevant arts, can also be used instead.

TX block 570, which corresponds to TX block 370 of FIG. 3, receives, from processing block 510, packets (such as those of the parallel data streams described above) to be transmitted on a wireless signal (e.g., according to a wireless standard such as IEEE 802.11), generates a modulated radio frequency (RF) signal (according to the standard), and transmits the RF signal via switch 590 and antenna 595. TX block 570 may contain RF and baseband circuitry for generating and transmitting wireless signals, as well as for medium access operations. Alternatively, TX block 570 may contain only the RF circuitry, with processing block 510 performing the baseband and medium access operations (in conjunction with the RF circuitry).

RX block 580 represents a receiver that receives a wireless (RF) signal (e.g., according to IEEE 802.11) bearing data and/or control information via switch 590, and antenna 595, demodulates the RF signal, and provides the extracted data or control information to processing block 510. RX block 580 may contain RF as well as baseband processing circuitry for processing a WLAN signal. Alternatively, RX block 580 may contain only the RF circuitry, with processing block 510 performing the baseband operations in conjunction with the RF circuitry.

Non-volatile memory 550 is a non-transitory machine readable medium, and stores instructions, which when executed by processing block 510, causes STA 120 to operate as described above. In particular, the instructions enable STA 120 to operate as described with respect to the flowchart of FIG. 2. Further, nonvolatile memory 550 may store instructions corresponding to applications 301, 302 and 303, and may either be executed directly from non-volatile memory 550 or be copied to RAM 530 for execution. Some form of multitasking kernel may in addition be stored and executed in non-volatile memory 550 (or alternatively in RAM 530) to enable parallel execution of the applications 301-303, as well as the code required to implement the operations of the flowchart of FIG. 2.

RAM 530 is a volatile random access memory, and may be used for storing instructions and data. In addition, RAM 530 may be used to store the transmission profiles (391-393) described above. RAM 530 may also be used to store LUTs 321-323, queues 311-313, and any data used by applications 301-303.

RAM 530 and non-volatile memory 550 (which may be implemented in the form of read-only memory/ROM/Flash) constitute computer program products or machine (or computer) readable medium, which are means for providing instructions to processing block 510. Processing block 510 may retrieve the instructions, and execute the instructions to provide several features of the present disclosure.

Processing block 510 (or processor in general) may contain multiple processing units internally, with each processing unit potentially being designed for a specific task. Alternatively, processing block 510 may contain only a single general-purpose processing unit. Rate adaptation module 330 may either be implemented as a sub-portion (i.e., in hardware form) of processing block 510, or may represent software instructions (stored in either non-volatile memory 550 or RAM 530) and executed by processing block 510. Processing block 510 may execute instructions stored in non-volatile memory 550 or RAM 530 to enable STA 120 to operate according to several aspects of the present disclosure, described above in detail.

8. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of transmitting parallel data streams from a wireless station (STA) of a wireless network, said method being implemented in said STA, said method comprising:

maintaining a plurality of transmission profiles, each transmission profile in the plurality of transmission profiles corresponding to a respective data stream of said parallel data streams;

queueing packets of each data stream in a corresponding queue, wherein a first queue contains a first sequence of packets of a first data stream received in a first order, wherein a second queue contains a second sequence of packets of a second data stream received in a second order;

selecting a first packet from said first queue and a second packet from said second queue;

determining a transmission rate for a packet according to a transmission profile of a corresponding queue, wherein said determining determines that said first packet is to be transmitted at a first transmission rate based on a first profile associated with said first data stream, and that said second packet is to be transmitted at a second transmission rate based on a second profile associated with said second data stream; and transmitting said first packet and said second packet, wherein all of said first sequence of packets and said second sequence of packets are together transmitted in a transmission order, wherein a first packet of said first sequence of packets is transmitted immediately after a second packet of said second sequence of packets in said transmission order, wherein said first packet is transmitted at said first data rate and said second packet is transmitted at said second data rate.

2. The method of claim 1, wherein said first packet and said second packet are transmitted using a same antenna, said method further comprising:
executing a plurality of applications in said STA,
wherein each transmission profile is associated with a corresponding application of said plurality of applications,
wherein the transmission rate for packets of corresponding application is controlled by the corresponding transmission profile.

3. The method of claim 1, wherein said first profile is a low power profile and said second profile is a high throughput profile.

4. The method of claim 3, wherein a first application executing in said STA generates said first sequence of packets and a second application executing in said STA generates said second sequence of packets.

5. The method of claim 4, wherein said first sequence of packets represents measurement data from a sensor, and said second sequence of packets represents video data.

6. The method of claim 3, wherein an initial transmission rate corresponding to said low power profile is selected based on a strength of a wireless signal received at said STA, wherein an initial transmission rate corresponding to said high throughput profile is a predetermined minimum required rate.

7. The method of claim 6, wherein in the event of an unsuccessful transmission, a first lower transmission rate is set as the new transmission rate for said low power profile if said first lower transmission rate is successful,
wherein in the event of an unsuccessful transmission, a second lower transmission rate is set as the new transmission rate for said high throughput profile only if said first lower transmission rate is successful and is greater than said predetermined minimum required rate, wherein if said second lower transmission rate is lower than said predetermined minimum required rate, then said predetermined minimum required rate is set as the new transmission rate.

8. The method of claim 7, wherein for packets of said low power profile, a higher transmission rate than a current transmission rate is attempted after a first number of successful transmissions at said current transmission rate,
wherein for packets of said high throughput profile, a higher transmission rate than a current transmission rate is attempted after a second number of successful transmissions at said current transmission rate, wherein said second number is greater than said first number.

9. A machine readable non-transitory medium storing one or more sequences of instructions for enabling a wireless station (STA) of a wireless network to transmit parallel data streams, wherein execution of said one or more instructions by one or more processors contained in said STA enables said STA to perform the actions of:
maintaining a plurality of transmission profiles, each transmission profile in the plurality of transmission profiles corresponding to a respective data stream of said parallel data streams;
queuing packets of each data stream in a corresponding queue, wherein a first queue contains a first sequence of packets of a first data stream received in a first order, wherein a second queue contains a second sequence of packets of a second data stream received in a second order;
selecting a first packet from said first queue and a second packet from said second queue;
determining a transmission rate for a packet according to a transmission profile of a corresponding queue, wherein said determining determines that said first packet is to be transmitted at a first transmission rate based on a first profile associated with said first data stream, and that said second packet is to be transmitted at a second transmission rate based on a second profile associated with said second data stream; and
transmitting said first packet and said second packet, wherein all of said first sequence of packets and said second sequence of packets are together transmitted in a transmission order, wherein a first packet of said first sequence of packets is transmitted immediately after a second packet of said second sequence of packets in said transmission order, wherein said first packet is transmitted at said first data rate and said second packet is transmitted at said second data rate.

10. The machine readable non-transitory medium of claim 9, wherein said first packet and said second packet are transmitted using a same antenna, the actions further comprising:
executing a plurality of applications in said STA,
wherein each transmission profile is associated with a corresponding application of said plurality of applications,
wherein the transmission rate for packets of corresponding application is controlled by the corresponding transmission profile.

11. The machine readable non-transitory medium of claim 9, wherein said first profile is a low power profile and said second profile is a high throughput profile.

12. The machine readable non-transitory medium of claim 11, wherein a first application executing in said STA generates said first sequence of packets and a second application executing in said STA generates said second sequence of packets.

13. The machine readable non-transitory medium of claim 12, wherein said first sequence of packets represents measurement data from a sensor, and said second sequence of packets represents video data.

14. The machine readable non-transitory medium of claim 11, wherein an initial transmission rate corresponding to said low power profile is selected based on a strength of a wireless signal received at said STA, wherein an initial transmission rate corresponding to said high throughput profile is a predetermined minimum required rate.

15. The machine readable non-transitory medium of claim 14, wherein in the event of an unsuccessful transmission, a first lower transmission rate is set as the new transmission rate for said low power profile if said first lower transmission rate is successful,
wherein in the event of an unsuccessful transmission, a second lower transmission rate is set as the new transmission rate for said high throughput profile only if said first lower transmission rate is successful and is greater than said predetermined minimum required rate, wherein if said second lower transmission rate is lower than said predetermined minimum required rate, then said predetermined minimum required rate is set as the new transmission rate.

16. The machine readable non-transitory medium of claim 15, wherein for packets of said low power profile, a higher transmission rate than a current transmission rate is attempted after a first number of successful transmissions at said current transmission rate,
wherein for packets of said high throughput profile, a higher transmission rate than a current transmission rate is attempted after a second number of successful transmissions at said current transmission rate, wherein said second number is greater than said first number.

17. A wireless station (STA) of a wireless network, said STA comprising:
    a processing block, a memory, and a transmitter circuit, said memory to store instructions which when retrieved and executed by said processing block causes said STA to perform the actions of:
        maintaining a plurality of transmission profiles, each transmission profile in the plurality of transmission profiles corresponding to a respective data stream of said parallel data streams;
        queuing packets of each data stream in a corresponding queue, wherein a first queue contains a first sequence of packets of a first data stream received in a first order, wherein a second queue contains a second sequence of packets of a second data stream received in a second order;
        selecting a first packet from said first queue and a second packet from said second queue;
        determining a transmission rate for a packet according to a transmission profile of a corresponding queue, wherein said determining determines that said first packet is to be transmitted at a first transmission rate based on a first profile associated with said first data stream, and that said second packet is to be transmitted at a second transmission rate based on a second profile associated with said second data stream; and
        transmitting said first packet and said second packet, using said transmitter circuit, wherein all of said first sequence of packets and said second sequence of packets are together transmitted in a transmission order, wherein a first packet of said first sequence of packets is transmitted immediately after a second packet of said second sequence of packets in said transmission order, wherein said first packet is transmitted at said first data rate and said second packet is transmitted at said second data rate.

18. The STA of claim 17, wherein the actions further comprise:
    executing a plurality of applications in said STA,
    wherein each transmission profile is associated with a corresponding application of said plurality of applications,
    wherein the transmission rate for packets of corresponding application is controlled by the corresponding transmission profile.

19. The STA of claim 17, wherein said first profile is a low power profile and said second profile is a high throughput profile.

20. The STA of claim 19, wherein a first application executing in said STA generates said first sequence of packets and a second application executing in said STA generates said second sequence of packets.

* * * * *